Feb. 11, 1941.   J. L. STEPHEN   2,231,457
ELECTRICAL APPARATUS
Filed Aug. 3, 1936   4 Sheets-Sheet 1

Inventor
John L. Stephen
By Fisher, Clapp, Soans & Pond Attys.

Feb. 11, 1941.  J. L. STEPHEN  2,231,457
ELECTRICAL APPARATUS
Filed Aug. 3, 1936   4 Sheets-Sheet 3

Inventor
John L. Stephen
By Fisher, Clapp, Soans & Pond
Attys.

Feb. 11, 1941.                 J. L. STEPHEN                    2,231,457
                            ELECTRICAL APPARATUS
                          Filed Aug. 3, 1936      4 Sheets-Sheet 4

Inventor
John L. Stephen
By Fisher, Clapp, Soans & Pond
Attys.

Patented Feb. 11, 1941

2,231,457

UNITED STATES PATENT OFFICE 2,231,457

ELECTRICAL APPARATUS

John L. Stephen, Chicago, Ill.

Application August 3, 1936, Serial No. 93,944

30 Claims. (Cl. 34—24)

My invention relates generally to apparatus for accomplishing the heat treating and drying of various materials through the use of high frequency electrostatic fields, and has particular reference to drying apparatus of this type suitable for the drying and treatment of wood and of bulk materials.

It is to be understood that the heating effect of high frequency electrostatic fields is well known and that suggestions have been made from time to time that commercial use might be made of this heating effect for drying various materials. Prior attempts along this line have not, however, proven at all satisfactory, primarily because of the inability of the apparatus heretofore known to the art to satisfactorily and automatically adapt itself to the varying conditions met with during the carrying out of such drying and treating operations. These deficiencies of the prior art have been particularly serious in apparatus for the drying and treatment of wood.

The principal object of the present invention, therefore, is to provide a fool-proof, commercially practical device for accomplishing the continuous treating and drying of various materials through the use of high frequency electrostatic fields. Other and more specific objects of the invention are to provide a treating and drying apparatus of this type which shall be entirely automatic in its operation and which shall automatically vary the heating effect in differing portions of the material being treated in order to accomplish the most satisfactory heating thereof; to provide a treating apparatus for wood or like material wherein provision is made for steaming or otherwise controlling the humidity and the temperature at the ambient medium about the material being treated during and after the process is completed; to provide an improved means for manufacturing multi-ply materials such as shatter proof glass and ply board; and to provide a heat treating apparatus of the subject type wherein the material to be treated may be held against warping or caused to conform to a particular shape during the treating operation.

Other objects and advantages of the invention will be made more apparent in the following description of certain preferred embodiments thereof, and in the accompanying drawings wherein—

Figure 1:
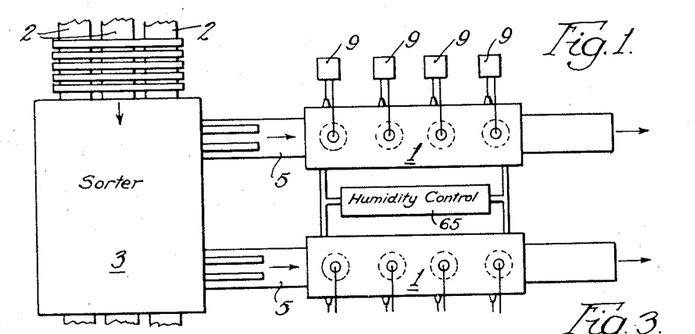
Figure 1 is a schematic view of an apparatus in accordance with the present invention for accomplishing the continuous treating and drying of wood.

Two of the sections of a battery of heating ovens for accomplishing the drying and heat treatment of wood are indicated at 1 in Figure 1. Pieces of wood will be brought from the source of supply by means of conveyors such as are illustrated generally at 2 and led into a suitable sorting mechanism indicated generally at 3. Pieces of proper size for the particular oven with which the unit is associated will be separated from the material passing through the sorting mechanism and fed into the oven by means of a conveyor indicated generally at 5. Each of the ovens 1 comprises an elongated chamber having suitable heat insulating walls and a conveyor for the material to be treated extending therethrough. Guides (not shown) assure the proper movement of the material through the oven chamber.

A plurality of pairs of spaced cooperating electrodes 8 are arranged along the path of movement of the material within the oven 1, and each pair of electrodes is preferably energized from a separate high frequency source of variable frequency, such sources being shown diagrammatically at 9.

As is well known, the moisture content of wood or other materials which it may be desired to dry or heat treat will vary between rather wide limits, and to accomplish the satisfactory drying of the material in the minimum possible time without overheating or injury thereto, it is necessary that the heating effect of the high frequency field shall be varied in accordance with such moisture content. I have found that the amount of power required in a properly adjusted circuit is a very satisfactory measure of the moisture content, and through the provision of control means responsive to this power consumption, it is possible to most accurately and most satisfactorily regulate the heating effect. Such control means are indicated generally at 11 in Figure 2 and in Figure 8. The control means may be arranged to vary the frequency and in that manner alter the heating effect, or it may be utilized to vary the power output of the high frequency generator. The important thing, however, is that the heating effect shall vary in accordance with the amount of heat required to accomplish the desired treatment or drying while at the same time preventing overheating of the material.

As an example of the manner in which this control means will operate during a continuous drying treatment—to accomplish the satisfactory drying of a piece of wood of high moisture content, it might be necessary to subject that wood to the maximum heating effect during its entire passage through the drying oven. In contrast with this, a piece of wood containing a relatively small amount of moisture might be fully dried by the heating effect of the first few electrodes, and were the heating effect to be continued during the passage between the remaining pairs of electrodes serious permanent damage to the material being treated might result. For such materials an almost complete cessation of the heating effect may be required during the passage of the wood through the remainder of the drying chamber.

The drying or treating of the wood may be accomplished on a continuously moving conveyor, or the material may be moved into the drying chamber and caused to remain stationary for a fixed period of time.

In the drying or treating of wood, it is frequently desirable that the wood shall be held against warping during the drying operation. It is extremely difficult to satisfactorily accomplish this in the ordinary type heated drying oven, for the reason that the clamping means usually prevents free access of the heat to the material to be dried. Electrostatic heating, however, permits the wood or other material to be clamped during the drying or treating operation, for the reason that the heat is most intense at the inner portion of the material being dried.

Figures 2, 3, 4, 5, 6:
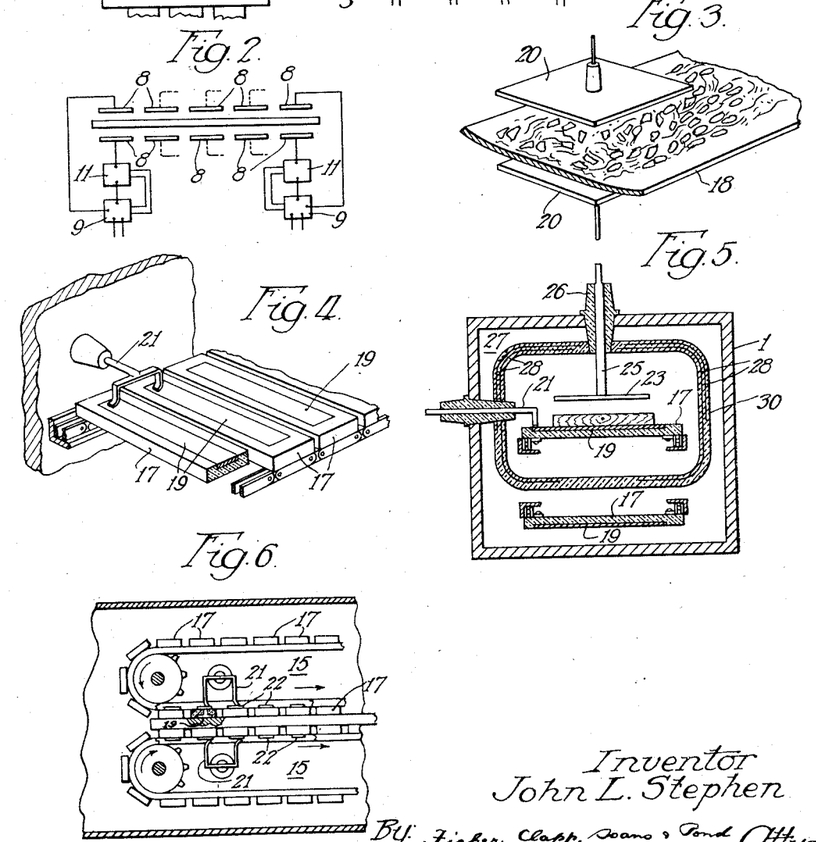
Figure 2 is a diagrammatic view showing the arrangement of the electrodes in the apparatus shown in Figure 1.
Figure 3 is a fragmentary perspective view showing certain of the features of a modified form of the apparatus particularly suitable for heat treating or drying bulk materials.
Figure 4 is a fragmentary perspective view showing the features of a modified form of electrode suitable for use in the apparatus illustrated generally in Figure 1.
Figure 5 is a sectional view through a drying oven utilizing electrodes similar to those illustrated in Figure 4.
Figure 6 is a fragmentary perspective view of a conveyor of a type particularly suited for accomplishing certain of the objects of the invention, the conveyor being so arranged that the material being treated is held in position by the conveyor itself during the treating operation.

I have found that suitable conveyors which may of themselves comprise the electrodes for the electrostatic fields can be used both for moving the wood to be treated through the treating oven and for holding the wood in proper position throughout the heating operation. Conveyors of this general type are illustrated in Figures 4, 5, and 6. The conveyor arrangement illustrated in Figure 6 combines both of these features, and comprises a pair of opposed link platform units 15 which are supported so as to present substantially parallel conveyor faces. The piece of wood to be dried is directed between these two conveyors and through the use of adjustable supports preferably of a resilient type for one or both of the conveyor units may be securely held in position during the drying or treating operation. The transverse members 17 of the conveyor are of an insulating material, as for example, a phenolic resin condensate product or very dry wood, which can be exposed to a high frequency electrostatic field without injury, and relatively thin, flat plates 19 of metal are imbedded or affixed to the upper surfaces of these transverse members 15. Through the use of brush connections 21 or like means which contact suitable connectors 22 on the inner side of the transverse members 17, these plates 19 are progressively connected to the different sources of high frequency current as they move through the treating oven thereby serving as the electrodes for the heating fields. This arrangement constitutes a most satisfactory means for effecting the heating of the material to be treated, while at the same time holding that material to prevent its being warped during the treating operation.

It is, of course, possible to use a single conveyor having the electrodes of the type just described. An arrangement of this general form is illustrated in Figures 4 and 5. The electrodes for cooperating with the electrodes of the conveyor constitute suitable plates 23 supported upon the central conductors 25 of insulators 26 which pass through the walls of the treating oven.

A belt type conveyor arranged to accomplish the continuous heat treating and drying of bulk materials through the use of one or more high frequency electrostatic fields is illustrated generally in Figure 3. This apparatus includes a suitable conveyor belt 18, of an insulating material which is not substantially heated or deteriorated by exposure to high frequency fields, and one or more pairs of spaced electrodes 20 between which the conveyor belt is adapted to pass.

As mentioned previously, the utilization of a plurality of separate sources of high frequency current is of the greatest importance in accomplishing the objects of the present invention. This arrangement permits the treatment of individual sections of the material as it passes through the drying oven, and also permits the simultaneous use of various frequencies, which arrangement is of the greatest benefit in drying and treating certain types of material. When using a plurality of separate electrostatic fields, however, and a plurality of pairs of electrodes in relatively close proximity to each other as is necessary in apparatus of this type, electrostatic shielding means for accomplishing the most advantageous distribution of the fields will be found to be of the greatest possible value in assuring the maximum efficiency of the heating. The particular type of electrostatic shield must, of course, be ascertained for each particular installation, and while I have indicated a shield generally at 27 in Figure 5, this shield comprising suitably shaped pieces 28 of foil or thin sheet metal embedded in an insulating medium 29 similarly to a condenser bushing, it is to be understood that it is not my intention to limit myself to any particular type of shield.

In certain installations it is necessary to use curved electrodes in conjunction with each of the high frequency generators and for some installations I have found that electrodes having the general form of cylindrical sections accomplish most desirable results. Such electrodes are shown at 29 in Figure 7.

The particular form of high frequency generator utilized in conjunction with the present apparatus is not an important feature of the invention. If desired, a vacuum tube oscillator such as is illustrated diagrammatically in Figure 8 may be employed with considerable success. This generator includes a three element vacuum tube 31 which is arranged to generate high frequency power at the desired frequency. The filament of the tube 31 is adapted to be energized by a transformer 37, the secondary side of which has an intermediate tap 38.

Figures 7, 8:
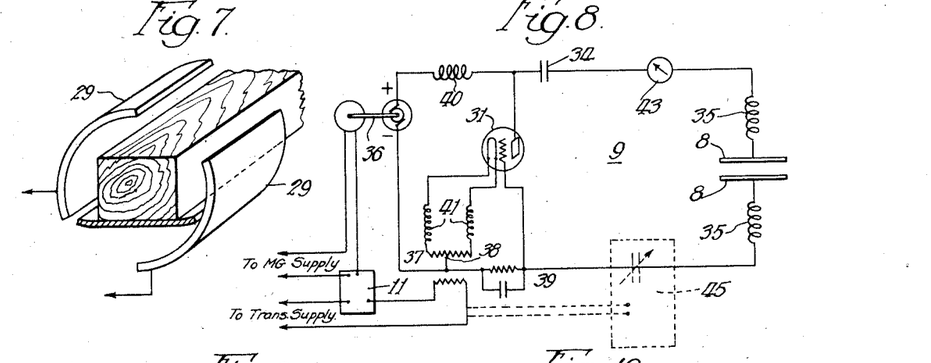
Figure 7 is a fragmentary perspective view showing a modified form of electrode suitable for use in conjunction with certain types of material.
Figure 8 is a diagrammatic view showing the electrical connections of one of the high frequency generators forming a part of the drying apparatus illustrated generally in Figure 1.

During the operation of the high frequency generator the primary of the filament transformer 37 is excited from a suitable source of alternating current, thereby energizing the secondary of the filament transformer which supplies power to the filament or cathode of the oscillator tube 31. Radio frequency chokes 41 are introduced into either side of the filament supply in order to increase the efficiency of operation of the oscillator. The motor element of the motor generator set 36 is energized from a suitable supply through the control means 11, the control means, as mentioned previously, being responsive to the power required in the oscillator circuit to regulate the output of the generator.

Suitable high potential is supplied to the plate of the oscillator tube 31 from the generator element of the motor generator set 36. The positive side of the generator is connected directly to the plate of the oscillator tube 31 through a radio frequency choke 40, and the negative side of the generator is connected to the filament cathode through the intermediate tap 38 in the secondary of the filament transformer and to the gride of the oscillator tube 31 through a parallel grid leak and condenser 39.

The oscillator circuit proper is a resonant circuit and includes the two spaced electrodes 8 one of which is connected to the grid of the oscillator tube through an inductance 35, and the other of which is connected to the plate of the oscillator tube through a second inductance 35 and a capacitance 34. The frequency of oscillation of the tube circuit may be varied by varying the spacing of the electrodes 8, the impedance of the inductances 35 and the condenser 34, or either of them. It will be apparent that the circuit is substantially the same as the conventional radio oscillator circuit and, of course, operates in a similiar manner. If desired, a current indicating device indicated at 43 may be introduced into the electrode circuit. The control apparatus for varying the heating effect, indicated generally at 11 accomplishes the desired variations in the heating effect of the field by varying the plate potential. The control apparatus may, of course, be arranged to vary the normal oscillating frequency of the circuit by varying the constants of that circuit or in any other way, as is well known in the art. Such an arrangement is indicated diagrammatically at 45. Preferably, the control means 11 includes means for limiting the high frequency current to some maximum safe value which is the function of the material being treated, and while automatic control of the heating effect is the preferred method, manual control is within the contemplation of my invention.

Figure 15:
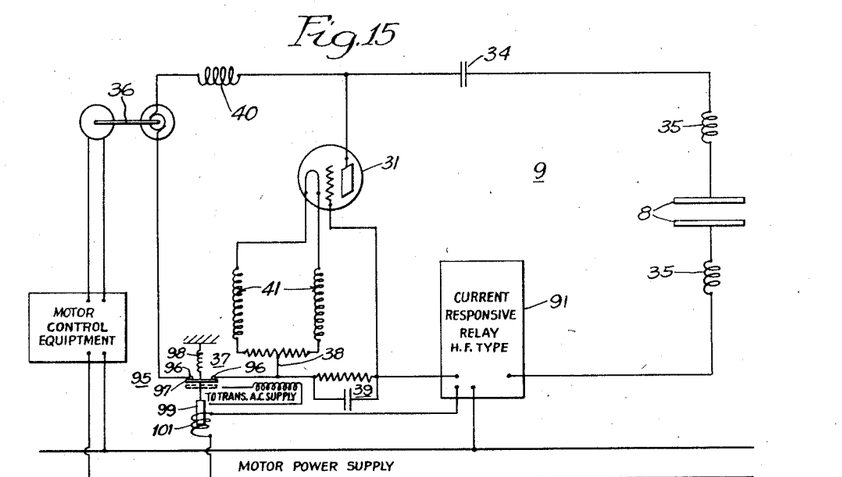
Figures 15 through 18 are circuit diagrams illustrating various control arrangements for the high frequency generators forming a part of the apparatus illustrated generally in Figure 1.
Figure 16:
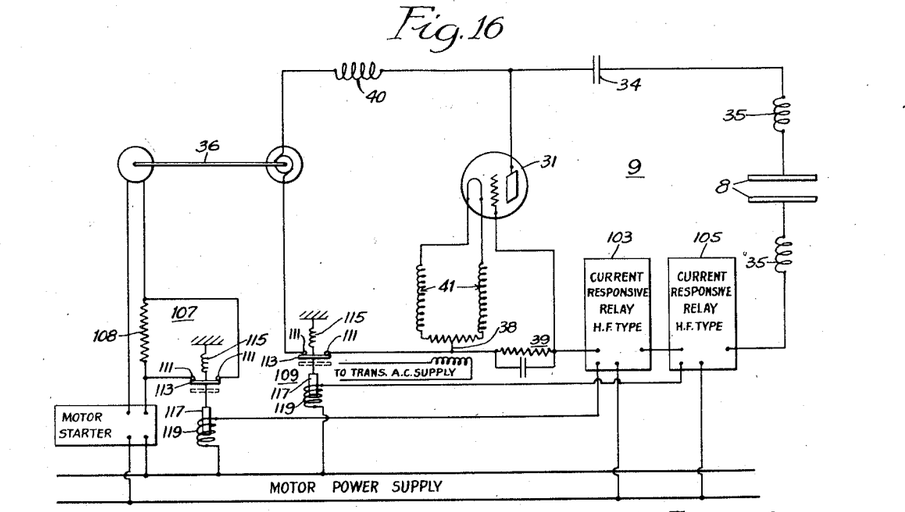

The particular frequency to be used will depend to some extent upon the material being treated. For most materials a frequency within the range of a few hundred to forty or fifty thousand kilocycles will be found satisfactory. Two general types of illustrative control arrangements for determining or controlling the heating effect of the individual fields are illustrated in Figures 15 through 18. Since the output potential of a high frequency generator such as is illustrated in Figure 8 normally varies only between rather definite limits, the in-phase component of the high frequency output current is a reasonably accurate indication of the power consumption in the high frequency circuit. Hence, control relays responsive to this in-phase component may be provided in the output circuit for limiting or otherwise controlling the heating effect of the field. Systems of this type are illustrated in Figures 15 and 16. Vacuum tube relay equipment responsive to the in-phase component are available as commercial apparatus of various manufacturers and their features will not, therefore, be described.

The circuit of Figure 15 is exactly similar to the circuit of Figure 8 except for the introduction of a relay 91 responsive to the power required in the high frequency output from the oscillator tube 31 (i. e. responsive to the in-phase current component of the high frequency output) and a relay 95 for opening the high voltage D. C. supply circuit to the tube in the event of excessive current flow, i. e., excessive heating. The high frequency current responsive relay 91 should, of course, be adjustable and the high voltage relay in the D. C. supply may conveniently be of the type illustrated at 95. This relay 95 includes two contact points 96 normally closed by a suitable conductor member 97 which is biased to the closed position by a tension spring 98.

An armature 99 is mechanically connected to the conductor member 97 and is adapted to move that member to the open position (indicated by dotted lines) upon the energization of a suitable solenoid 101 which is connected to a suitable power source such as the power supply for the motor circuit through the high frequency relay 91 which, as stated before, will probably be of the vacuum tube type. This arrangement will operate merely to shut off the high frequency field generated by the oscillator in the event excessive heating would result from continued maintenance of such field.

Since the relay 95 is biased to the closed position, it may be of the time delay type, i. e. so arranged that it will not reclose until a short interval following the operation of the high frequency relay 91. A time delay means is not essential, however, since repeated and successive operations of the high frequency and the input relays will, of course, limit the heating effect.

The control arrangement illustrated in Figure 16 utilizes two high frequency current responsive relays 103 and 105 connected in the output circuit of the high frequency generator, each relay being responsive to in-phase components of a different value. The relay 103 is operable to energize a switching relay 107 which effects the insertion of a resistance 108 in the motor circuit and thereby limits the output of the motor generator. In the event that this reduces the heating effect insufficiently, it is contemplated that the second relay 105 will operate at an increased in-phase output to operate a second switching relay 109 which will open the D. C. high voltage input circuit.

Each of the switching relays 107 and 109 includes two contacts 111 normally closed by a conducting member 113, which member is biased to the closed position by a tension spring 115. Each switching relay also includes an armature 117 mechanically connected to the conducting member 113 and arranged to be moved to an open circuit position (indicated by dotted lines) by a solenoid 119, each solenoid being connected to a source of power such as the motor power supply through one of the current responsive high frequency relays. This arrangement is more flexible than the system of Figure 15 and provides for step operation, the initial step serving to reduce the output of the high frequency generator 9 by reducing the D. C. plate potential, while at the same time providing an auxiliary or additional means for completely shutting off the field in the event that the heating effect is still too large.

Figure 17:
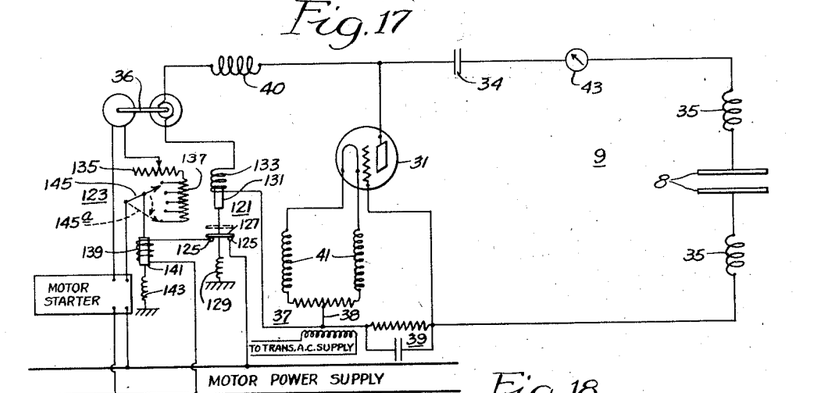
Figure 18:
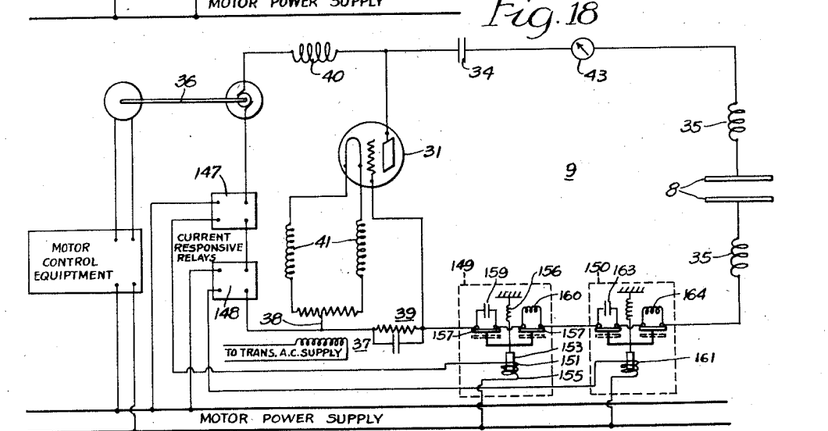

In instances where it is deemed more advantageous to handle the control from the D. C. side, control arrangements such as are illustrated in Figures 17 and 18 may be used. Referring particularly to Figure 17, it will be seen that the tube generator circuit therein illustrated is identical with the circuit of Figure 8, except for the introduction of a switching relay 121 in the high voltage D. C. supply and of an electrically operated resistance control 123 in the motor supply arranged to be energized by this relay.

The switching relay 121 is of the conventional current responsive type and includes two contacts 125 normally closed by a conducting member 127 biased to the closed circuit position by a spring 129. An armature 131 is provided for moving this member 127 to the open circuit position upon the energization of a solenoid illustrated at 133. The resistance control 123 for the motor half of the motor generator set 36 is in two sections. The upper section illustrated at 135 is adapted to be in the circuit at all times in order to make possible a definite limiting of the output of the high voltage D. C. generator by limiting the input voltage to the motor drive therefor. The other section 137 of the resistance control 123 is cut out upon the energization of a solenoid 139 which is adapted to raise an armature 141 against the biasing action of a spring 143 to move a contact arm 145 to the position illustrated in Figure 17. The solenoid 139 is, of course, connected to its power supply through the contacts 125 of the switching relay 121.

When the D. C. current in the supply to the high frequency generator reaches a predetermined magnitude, the switching relay 121 will operate to open the circuit between the points 125. This will de-energize the solenoid 139 holding the armature 141 in the upper position, and the switch arm 145 will move under the influence of the biasing spring 143 to the position indicated by the dotted lines 145ª of Figure 17, thereby introducing additional resistance in the motor circuit. Assuming the use of a conventional D. C. motor or a wound rotor induction type drive motor, this resistance change will produce a decrease in the voltage of the D. C. generator and hence a reduction in the output of the high frequency generator 9.

The circuit of Figure 18 is designed to produce the desired changes in the output of the high frequency generator 9 by means of variations in frequency which are accomplished by the changing of the characteristics of the output circuit. Referring to the drawings, two current responsive switching relays 147 and 148 have been connected into the high voltage plate supply circuit, and each is arranged to energize a solenoid constituting a part of one of the frequency changing relays 149 and 150 in the high frequency output circuit current. The current responsive relay 147 is arranged to operate at a lower current (i. e. at a lower output in the high frequency side) than the other relay 148, and upon operation will effect the energization of the solenoid 151 of the frequency changing relay 149 which is connected thereto. The armature 153 forming a part of the relay 149 will thereupon be moved downwardly against the force of the biasing spring 156 to move the conducting members 157 away from the contact points with which they normally connect, as indicated by the dotted lines. This opening will introduce capacitance and inductance or any combination thereof, as illustrated diagrammatically at 159 and 160, into the output circuit and will alter the frequency so as to reduce the heating effect.

In the event that this frequency change is insufficient, the operation of the second current responsive relay 148 may serve to energize the operating solenoid 161 of the second frequency changing relay 150 to introduce additional capacitance and inductance, as indicated schematically at 163 and 164, into the output circuit, or, if desired, the operation of the second relay may open the high frequency output circuit or open the D. C. input circuit. In certain instances, the opening of the high frequency output circuit will be more satisfactory from the viewpoint of minimizing the difficulty of re-establishing oscillation in the high frequency generator.

It will be understood that the various control systems described in the foregoing are illustrative and that various other arrangements can be worked out by persons skilled in the art. Likewise, various combinations of these several arrangements may be evolved. The circuits serve, however, to illustrate specific means for accomplishing each of the various types of control which have been described above.

Figure 9:
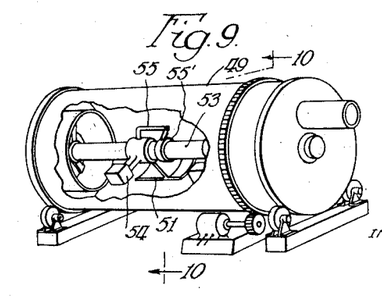
Figure 9 is a perspective view of a rotary type drier utilizing a high frequency electrostatic field for accomplishing the heating of the material to be dried.
Figure 10:
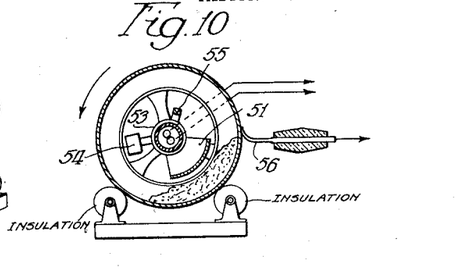
Figure 10 is a sectional view on the general line 10—10 of Figure 9 illustrating the form and arrangement of the electrodes employed in that apparatus.

A rotary type drying apparatus particularly adapted for handling bulk materials is illustrated in Figures 9 and 10. Apparatus of this type ordinarily comprises a rotary drum 49 with means, such as a blower and heat source (not shown), for circulating hot air through the bulk material which is conveyed therethrough as the drum rotates. An electrostatic field may very conveniently be utilized for drying bulk material in this type of drum. Preferably, one or more electrodes similar to that indicated at 51 in Figure 10, is journaled upon a central shaft 53 preferably of insulating material and held in position by means of a counterbalance 54. Connection to the source of high frequency power is made by a brush 55 and slip ring 55'. A portion of the drum itself is preferably utilized as the other electrode or electrodes, contact thereto being made by a brush 56. An insert in the drum wall of a molded phenolic condensation product having metallic plates supported at the inner surface thereof will also be found to be most satisfactory for this purpose. Preferably the drum is supported upon insulating rollers or otherwise insulated from ground. Other arrangements are, of course, within the contemplation of the invention.

Figures 11, 12, 13, 14:
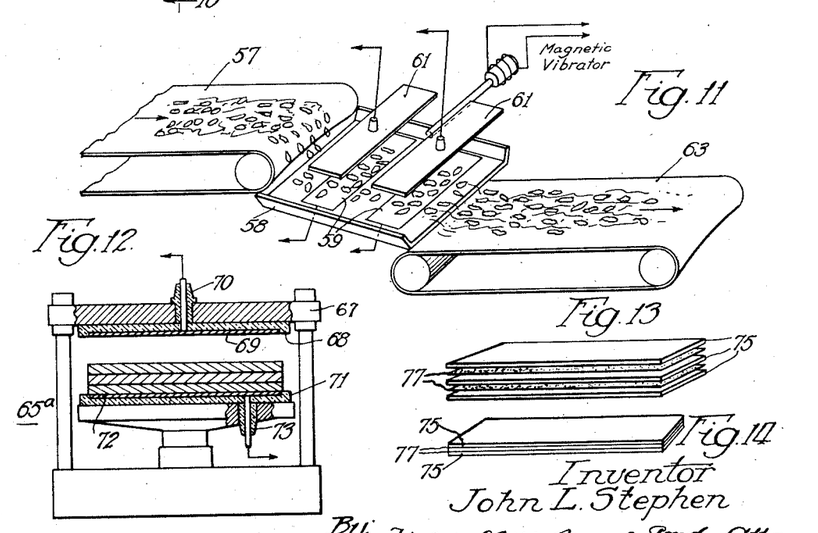
Figure 11 is a diagrammatic view of another embodiment of the invention intended particularly for the heat treatment or drying of bulk materials.
Figure 12 is a sectional view of a press of the type generally used for manufacturing ply wood equipped with electrostatic field heating means.
Figure 13 is an exploded perspective view of the several plies used in the manufacture of ply wood or like material by a press such as that illustrated in Figure 12.
Figure 14 is a perspective view of the finished product.

Another arrangement for accomplishing the drying of bulk materials is illustrated generally in Figure 11. A belt conveyor 57 or the like serves to discharge the material to be treated onto a plate type conveyor member 58 which is preferably vibrated as by a magnetic vibrator so as to move the bulk material therealong at a predetermined speed. Suitable exposed electrodes 59 are positioned on the upper surface of this conveyor member and cooperate with other electrodes 61 arranged at a suitable distance thereabove. Electrostatic shielding will be found highly advantageous, if not in fact necessary, in this type of apparatus. As the bulk material moves down the conveyor member 58 it is dried or otherwise treated and is then discharged in the dried state upon a second belt conveyor 63 or other means for removal to a storage point or the like.

In carrying out the drying and treating of wood, it has been found that careful control of the humidity and the temperature of the ambient medium within the drying chamber is of the utmost value. The apparatus of the present invention particularly lends itself to this type of operation, for the reason that a humidifying apparatus may be readily used in conjunction with the treating ovens of the present invention. Such an apparatus is indicated at 65 in Figure 1.

Figure 19:
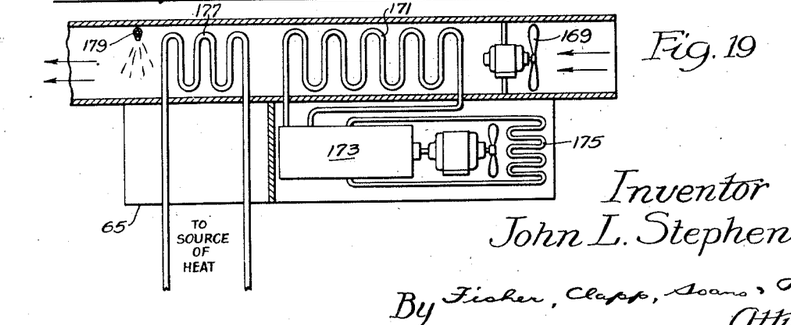
Figure 19 is a diagrammatic view illustrating one form of humidity control apparatus which may be used in conjunction with the drying apparatus illustrated generally in Figure 1.

The humidity control apparatus 65, as illustrated schematically in Figure 19, includes a fan 169 or other means for circulating air within the ovens 1 and refrigerator means including evaporator coils 171, a condenser 173, and a heat exchange system 175 for removing moisture from the circulated air. The apparatus also includes a heating means such as the radiator illustrated generally at 177 for heating the dried air and also a spray 179 or comparable arrangement for washing the air or for adding moisture in the event that this should be desired. Humidity control apparatus is, of course, a commercially available product, and for that reason none of the details of the control relays, thermostats, and the like, or the specific arrangements of the refrigerator means, heating means, fans, and spray means have been shown. The arrangement of Figure 19 merely illustrates diagrammatically the units provided in the ordinary humidity control arrangements.

The heating effect of high frequency electrostatic fields may be used with particularly satisfactory results during the manufacture of multi-ply articles such as ply wood, shatterproof glass, and the like. Plywood, as is well known in the art, is a press product comprising a plurality of sheets of wood which are glued together. During the unusual method of manufacture, a plurality of relatively thin sheets, such as are shown at 75 in Figure 13, are arranged in superposed relation with alternate thin sheets of glue or other adhesive 77, and the entire assemblage is pressed together in a hydraulic press generally similar to that indicated at 65ª in Figure 12. The platens of the press heretofore used are heated, as by steam, and as the heat is transmitted through the pressed sheets product fusion of the glue occurs with accompanying joindure of the sheets. Shatterproof glass is manufactured by a similar process. The heating of the glue or other adhesive by heated platen presses is a very slow process and as a result the If, however, the upper platform 67 of such a press is provided with an insulating platen 68 having a flat sheet electrode 69 embedded or otherwise supported in the surface thereof, and the other platen is provided with a similar insulating plate 71 and electrode 72, the heating of the sheet or sheets of adhesive 77 may be accomplished by the use of a high frequency electrostatic field, the insulators 70 and 73 serving to connect the electrodes 69 and 72 to a suitable source of high frequency energy. Heating by the use of a high frequency electrostatic field of this type permits very rapid operation of the press, for the reason that heating may be concentrated directly in the adhesive thereby producing much more satisfactory plywood and like products than the heated platen methods of the prior art. Other press operations, including forming operations, either upon wood or upon other materials may be carried out in presses of this type, the extreme flexibility of the high frequency electrostatic field method of heating particularly lending itself to convenient control of the degree and intensity of the heating effect with resulting improvement of the product.

From the foregoing, it will be seen that I have disclosed the features of a practical apparatus for accomplishing the continuous drying and heat treating of wood and of bulk materials. The apparatus of my invention embodies a number of important novel features and arrangements which are, in the main, responsible for the successful and satisfactory operation thereof. Some of these features are: the use of a plurality of separate electrostatic fields and a plurality of separate sources of high frequency current which may be operated at differing frequencies; the use of control means in conjunction with such sources of high frequency electrical power to cause the heating effect thereof to be varied in accordance with the requirements of the material which is being treated; the provision of a treating oven wherein drying may be accomplished in the presence of a relatively humid atmosphere; the provision of a drying and treating apparatus for wood or like material wherein the material being treated may be clamped or otherwise held against warping during the treating operation; and the provision of means for equalizing the plurality of electrostatic fields so as to most efficiently accomplish the heating of the material being treated.

Further, I have disclosed a novel type of press for manufacturing multi-ply materials or for press forming operations wherein heating of the material being worked is accomplished by the use of a high frequency electrostatic field or fields, this apparatus being particularly suitable for manufacturing plywood, shatterproof glass and like products.

I have also disclosed certain novel specific structural arrangements which are especially suited for carrying out the objects of the invention. In particular, I have disclosed a novel type of conveyor which may be used for holding the wood or other material against warping or in a predetermined position during the treating thereof, and which may of itself constitute one or more of the electrodes for the electrostatic heating fields; a novel tyep of electrode for use in conjunction with rotary type driers; and a novel type of conveyor for accomplishing the drying of bulk material.

Various modifications may, of course, be made in the particular form of the subject apparatus, and it is my intention, therefore, that the accompanying claims shall cover any such modifications or variations as may fall within the spirit and principles of my invention and shall be accorded the broadest reasonable construction consistent with the state of the art.

I claim the following as my invention:

1. In apparatus of the class described, an oven, a pair of continuous, platform-type conveyors for moving the material to be treated through said oven, said conveyors being so arranged that they serve to hold the material being treated in a predetermined position during the treating operation, a plurality of sources of high frequency electrical power, means integral with the conveyors for defining a plurality of pairs of spaced electrodes, and means for successively connecting said sources of high frequency electrical power to said pairs of spaced electrodes whereby a separate high frequency electrostatic field is set up between each of said pairs of spaced electrodes.

2. The method of treating and drying wood or other materials which consists in subjecting such material successively to a plurality of separate high frequency electrical fields at least some of which are maintained at differing predetermined frequencies.

3. The method of treating and drying wood or other materials which consists in subjecting such material successively to a plurality of separate, high frequency, electrical fields and simultaneously individually controlling the heating of each of said fields in response to variations in the rate of current flow to such field.

4. The method of treating and drying wood or other materials which consists in subjecting such material successively to a plurality of separate, high frequency, electrostatic fields, and simultaneously individually limiting the heating effect of each of said fields in response to the rate of current flow to such field.

5. The method of treating and drying wood or other materials which consists in subjecting such material successively to a plurality of separate, high frequency, electrostatic fields, and simultaneously individually controlling the frequency of each of said fields in response to variations in the rate of current flow to such field.

6. In apparatus of the class described, a pair of continuous, platform-type conveyors for moving material to be treated through said apparatus, said conveyors being so arranged that they serve to hold material being treated in a predetermined position during the movement of such material through said apparatus, a source of high frequency electrical power, means integral with said conveyors for defining a plurality of pairs of spaced electrodes which move through said apparatus with said conveyors, and means for successively connecting said source of high frequency electrical power to each of said pairs of electrodes as they move through said apparatus whereby a high frequency electrical field is set up successively between each pair of electrodes as an incident to the movement thereof through said apparatus.

7. In apparatus of the class described, a plurality of pairs of spaced electrodes, a separate source of high frequency electrical power for creating a high frequency electrical field between each pair of spaced electrodes, means for moving material to be treated through such fields in succession, and a plurality of automatically actuable control means, one of which is associated with each of a plurality of said sources of high frequency electrical power, for individually controlling the heating effect of said fields when said material is moved therethrough, each of said control means including relay means operable in response to predetermined variations in the rate of current flow to the electrodes for the associated field and means actuable in response to the operation of said relay means to adjust the output of the source of said field.

8. In apparatus of the class described, a plurality of pairs of spaced electrodes, a source of electrical power, a separate, high frequency electrical generator for creating a high frequency electrical field between each pair of spaced electrodes, means for moving material to be treated through such fields in succession, and a plurality of automatically operable control means, one of which is associated with each of a plurality of said high frequency generators for individually controlling the heating effect of said fields, each of said control means including relay means operable in response to predetermined variations in the rate of current flow to the electrodes for the field with which said relay means is associated and means actuable in response to the operation of said relay means to adjust the output of the generator for said field.

9. In apparatus of the class described, a plurality of pairs of spaced electrodes, a source of electrical power, a separate, high frequency electrical generator for creating a high frequency electrical field between each pair of spaced electrodes, means for moving material to be treated through such fields in succession, and a plurality of automatically operable control means, one of which is associated with each of a plurality of said high frequency generators, for individually controlling the heating effect of said fields, each of said control means including relay means operable in response to predetermined variations in the rate of current flow from said source of electrical power to the high frequency generator with which said relay means is associated and means actuable in response to the operation of said relay means to adjust the output of said high frequency generator.

10. In apparatus of the class described, a plurality of pairs of spaced electrodes, a source of electrical power, a separate, high frequency electrical generator for creating a high frequency electrical field between each pair of spaced electrodes, means for moving material to be treated through said fields in succession, and a plurality of automatically operable control means, one of which is associated with each of a plurality of said high frequency generators, for individually controlling the heating effect of said fields, each of said control means including relay means operable in response to predetermined variations in the rate of current flow to the electrodes for the field with which said relay means is associated and means actuable in response to the operation of said relay means to open the circuit between said source of electrical power and the generator for said field.

11. In apparatus of the class described, a plurality of pairs of spaced electrodes, a separate source of high frequency electrical power for creating a high frequency electrical field between each pair of spaced electrodes, each of said power sources including a vacuum tube oscillator and a source of high voltage direct current power, means for moving material to be treated through said fields in succession, and a plurality of automatically operable control means, one of which is associated with each of a plurality of said sources of high frequency electrical power, for individually controlling the heating effect of said fields, each of said control means including relay means operable in response to predetermined variations in the rate of current flow to the electrodes for the field with which said relay means is associated and means actuable in response to the operation of said relay means to open the circuit between the source of direct current power and the vacuum tube oscillator connected to said field.

12. In apparatus of the class described, a plurality of pairs of spaced electrodes, a separate source of high frequency electrical power for creating a high frequency electrical field between each pair of spaced electrodes, each of said sources of high frequency electrical power including a vacuum tube oscillator and a source of high voltage direct current power, means for moving material to be treated through said fields in succession, and a plurality of automatically operable control means, one of which is associated with each of said sources of high frequency electrical power, for individually controlling the heating effect of said fields, each of said control means including relay means operable in response to predetermined variations in the rate of current flow to the electrodes for the field with which said relay means is associated and means actuable in response to the operation of said relay means to reduce the voltage at which direct current power is supplied to the vacuum tube oscillator forming a part of the high frequency power source for said field.

13. In apparatus of the class described, an oven, a pair of continuous platform type conveyors for moving material to be treated through said oven, said conveyors being so arranged that they serve to hold material being treated in a predetermined position during the movement of such material through said apparatus, a source of high frequency electrical power, means integral with said conveyors for defining a plurality of pairs of spaced electrodes which move through said apparatus with said conveyors, means for successively connecting said source of high frequency electrical power to each of said pairs of electrodes as they move through said apparatus, whereby a high frequency electrical field is set up successively between each pair of electrodes as incident to the movement thereof through said apparatus, and means for controlling the humidity within said oven during the treating operation and independently thereof.

14. In apparatus of the class described, an oven, a conveyor for moving material to be treated through said oven, a plurality of pairs of spaced electrodes arranged along the path of movement of said conveyor, a plurality of separate sources of high frequency electrical power for creating a high frequency electrical field between each pair of spaced electrodes, means for controlling the ambient humidity and temperature within said oven, and a plurality of automatically operable control means, one of which is associated with each of a plurality of said sources of high frequency electrical power for individually controlling the heating effect of said fields when said material is moved therethrough, each of said control means including relay means operable in response to predetermined variations in the rate of current flow to the electrodes for the field with which said relay means is associated and means actuable in response to the operation of said relay means to adjust the output of the source of said field.

15. In apparatus of the class described, a plurality of pairs of spaced electrodes, a separate source of high frequency electrical power for creating a high frequency electrical field between each pair of spaced electrodes, each of said power sources including a vacuum tube oscillator and a source of high voltage direct current power, means for moving material to be treated through said fields in succession, and a plurality of automatically operable control means, one of which is associated with each of a plurality of said sources of electrical power, for individually controlling the heating effect of said fields when said material is moved therethrough, each of said control means including relay means operable in response to predetermined variations in the rate of current flow from said source of high voltage direct current power to the associated vacuum tube oscillator and means actuable in response to the operation of said relay means to adjust the output of said oscillator.

16. In apparatus of the class described, a plurality of pairs of spaced electrodes, a separate source of high frequency electrical power for creating a high frequency electrical field between each pair of spaced electrodes, each of said power sources including a vacuum tube oscillator and a source of high voltage direct current power, means for moving material to be treated through said fields in succession, and a plurality of automatically operable control means, one of which is associated with each of a plurality of said sources of electrical power, for individually controlling the heating effect of said fields when said material is moved therethrough, each of said control means including relay means operable in response to predetermined variations in the rate of current flow in the output side of the associated vacuum tube oscillator and means actuable in response to the operation of said relay means to adjust the output of said oscillator.

17. In apparatus of the class described, a plurality of pairs of spaced electrodes, a separate source of high frequency electrical power for creating a high frequency electrical field between each pair of spaced electrodes, each of said power sources including a vacuum tube oscillator and a source of high voltage power, means for moving material to be treated through such fields in succession, automatically operable control apparatus associated with each of a plurality of said sources of high frequency electrical power for individually controlling the heating effect of said fields when said material is moved therethrough, each of said control apparatus including relay means operable in response to predetermined variations in the rate of current flow to the associated field and means actuable in response to the operation of said relay means to adjust the output of said oscillator, and electrostatic shielding means positioned so as to at least partially enclose each of said pairs of spaced electrodes for obtaining proper distribution and separation of said fields.

18. In apparatus of the class described, a pair of continuous, platform-type conveyors for moving material to be treated, said conveyors being so arranged that they serve to hold material being treated in a predetermined position during the treating operation, a plurality of sources of high frequency electrical power, means integral with said conveyors for defining a plurality of pairs of spaced electrodes which move through said apparatus with said conveyors, means for successively connecting each of said sources of high frequency electrical power to one of said pairs of electrodes whereby a separate high frequency electrical field is set up between each of said pairs of spaced electrodes at a predetermined point during the passage of said electrodes through said apparatus, and a plurality of automatic control means, each associated with one of said sources of high frequency electrical power, for individually controlling the heating effect of said fields, each of said control means including relay means operable in response to predetermined variations in the rate of current flow to the electrodes for the associated field and means actuable in response to the operation of said relay means to control the heating effect of such field by adjusting the output of the source of said field.

19. In apparatus of the class described, a plurality of pairs of spaced electrodes, a separate source of high frequency electrical power for creating a high frequency electrical field between each pair of spaced electrodes, each of said power sources including a vacuum tube oscillator and a source of high voltage direct current power, means for moving material to be treated through said fields in succession, and a plurality of automatically operable control means, one of which is associated with each of a plurality of said sources of electrical power, for individually controlling the heating effect of said fields when said material is moved therethrough, each of said control means including relay means operable in response to predetermined variations in the rate of current flow from said source of high voltage direct current power to the associated vacuum tube oscillator and means actuable in response to the operation of said relay means to alter the frequency of oscillation of said oscillator.

20. In apparatus of the class described, a plurality of pairs of spaced electrodes, a separate source of high frequency electrical power for creating a high frequency electrical field between each pair of spaced electrodes, each of said power sources including a vacuum tube oscillator and a source of high voltage direct current power, means for moving material to be treated through said fields in succession, and a plurality of automatically operable control means, one of which is associated with each of a plurality of said sources of electrical power, for individually controlling the heating effect of said fields when said material is moved therethrough, each of said control means including relay means operable in response to predetermined variations in the rate of current flow in the output side of the associated vacuum tube oscillator and means actuable in response to the operation of said relay means to alter the frequency of oscillation of said oscillator.

21. In apparatus of the class described, a plurality of pairs of spaced electrodes, a separate source of high frequency electrical power for creating a high frequency electrical field between each pair of spaced electrodes, each of said power sources including a vacuum tube oscillator and a source of high voltage power means for moving material to be treated through such fields in succession, automatically operable control apparatus associated with each of a plurality of said sources of high frequency electrical power for individually controlling the heating effect of said fields when said material is moved therethrough, each of said control apparatus including relay means operable in response to predetermined variations in the rate of current flow to the associated field and means actuable in response to the operation of said relay means to alter the frequency of oscillation of said oscillator, and electrostatic shielding means positioned so as to at least partially enclose each of said pairs of spaced electrodes for obtaining proper distribution and separation of said fields.

22. In apparatus of the class described, a pair of continuous, platform-type conveyors for moving material to be treated, said conveyors being so arranged that they serve to hold material being treated in a predetermined position during the treating operation, a plurality of sources of high frequency electrical power, means integral with said conveyors for defining a plurality of pairs of spaced electrodes which move through said apparatus with said conveyors, means for successively connecting each of said sources of high frequency electrical power to one of said pairs of electrodes whereby a separate high frequency electrical field is set up between each of said pairs of spaced electrodes at a predetermined point during the passage of said electrodes through said apparatus, and a plurality of automatic control means, each associated with one of said sources of high frequency electrical power, for individually controlling the heating effect of said fields, each of said control means including relay means operable in response to predetermined variations in the rate of current flow to the electrodes for the associated field and means actuable in response to the operation of said relay means to control the heating effect of such field by altering the frequency of oscillation of said field.

23. In apparatus of the class described, a plurality of pairs of spaced electrodes, a separate source of high frequency electrical power for creating a high frequency electrical field between each pair of spaced electrodes, means for moving material to be treated through such fields in succession, and a plurality of automatically actuable control means, one of which is associated with each of a plurality of said sources of high frequency electrical power, for individually controlling the heating effect of said fields when said material is moved therethrough, each of said control means including relay means operable in response to predetermined variations in the rate of current flow to the electrodes for the associated field and means actuable in response to the operation of said relay means to alter the frequency of oscillation of said field.

24. In apparatus of the class described, a plurality of pairs of spaced electrodes, a source of electrical power, a separate, high frequency electrical generator for creating a high frequency electrical field between each pair of spaced electrodes, means for moving material to be treated through such fields in succession, and a plurality of automatically operable control means, one of which is associated with each of a plurality of said high frequency generators for individually controlling the heating effect of said fields, each of said control means including relay means operable in response to predetermined variations in the rate of current flow to the electrodes for the field with which said relay means is associated and means actuable in response to the operation of said relay means to alter the frequency of oscillation of the associated generator.

25. In apparatus of the class described, a plurality of pairs of spaced electrodes, a source of electrical power, a separate, high frequency electrical generator for creating a high frequency electrical field between each pair of spaced electrodes, means for moving material to be treated through such fields in succession, and a plurality of automatically operable control means, one of which is associated with each of a plurality of said high frequency generators, for individually controlling the heating effect of said fields, each of said control means including relay means operable in response to predetermined variations in the rate of current flow from said source of electrical power to the high frequency generator with which said relay means is associated and means actuable in response to the operation of said relay means to alter the frequency of said high frequency generator.

26. In apparatus of the class described, an oven, a conveyor for moving material to be treated through said oven, a plurality of pairs of spaced electrodes arranged along the path of movement of said conveyor, a plurality of separate sources of high frequency electrical power for creating a high frequency electrical field between each pair of spaced electrodes, means for controlling the ambient humidity and temperature within said oven, and a plurality of automatically operable control means, one of which is associated with each of a plurality of said sources of high frequency electrical power for individually controlling the heating effect of said fields when said material is moved therethrough, each of said control means including relay means operable in response to predetermined variations in the rate of current flow to the electrodes for the field with which said relay means is associated and means actuable in response to the operation of said relay means to alter the frequency of oscillation of said field.

27. The method of treating and drying wood or other materials which consists in subjecting such material successively to a plurality of separate, high frequency, electrical fields, at least some of which are maintained at different predetermined frequencies, and simultaneously holding the material against warping.

28. The method of treating and drying wood or other materials which consists in subjecting such material successively to a plurality of separate, high frequency, electrical fields while simultaneously individually controlling the heating effect of each of said fields in response to variations in the rate of current flow to such fields and holding the material being treated against warping during the treating operation.

29. The method of treating and drying wood or other materials which consists in subjecting such material successively to a plurality of separate, high frequency, electrostatic fields while simultaneously individually limiting the heating effect of each of said fields in response to the rate of current flow to such field and holding the material being treated against warping during the treating operation.

30. The method of treating and drying wood or other materials which consists in subjecting such material to a plurality of separate, high frequency electrostatic fields while simultaneously individually controlling the frequency of each of said fields in response to variations in the rate of current flow to such field and holding the material being treated against warping.

JOHN L. STEPHEN.

CERTIFICATE OF CORRECTION.

Patent No. 2,231,457.　　　　　　　　　　　　　　February 11, 1941.

JOHN L. STEPHEN.

It is hereby certified that error appears in the printed specification of the above numbered patent requiring correction as follows: Page 3, first column, line 71, after "impedance" insert the word --values--; page 5, second column, line 18, after "the" insert --products are relatively expensive.--; and that the said Letters Patent should be read with this correction therein that the same may conform to the record of the case in the Patent Office.

Signed and sealed this 18th day of March, A. D. 1941.

(Seal)

Henry Van Arsdale,
Acting Commissioner of Patents.